United States Patent [19]
Leistner

[11] 3,778,647
[45] Dec. 11, 1973

[54] ELECTRIC SALIENT-POLE MACHINE
[75] Inventor: Werner Leistner, Berlin, Germany
[73] Assignee: Siemens Aktiengesellschaft, Munich, Germany
[22] Filed: July 14, 1972
[21] Appl. No.: 272,080

[30] Foreign Application Priority Data
Sept. 24, 1971 Germany............... P 21 48 439.9

[52] U.S. Cl.................... 310/54, 310/58, 310/183
[51] Int. Cl. ........................................... H02k 9/00
[58] Field of Search ............... 310/54, 52, 58, 162, 310/163, 164, 269, 180, 183

[56] References Cited
UNITED STATES PATENTS
3,459,979 8/1969 Dickinson.................... 310/269
3,463,952 8/1969 Norris......................... 310/269
3,480,810 11/1969 Potter......................... 310/269
3,157,806 11/1964 Wiedemann.................. 310/269
3,261,995 7/1966 Kohn........................... 310/269

Primary Examiner—R. Skudy
Attorney—Hugh A. Chapin

[57] ABSTRACT

An electric salient-pole machine has excitation and damping windings which are directly cooled with a liquid. These windings are connected hydraulically in series so that the cooling liquid always flows first through the conductors of the damper winding. This cooling arrangement is especially advantageous for synchronous machines which are started asynchronously.

10 Claims, 4 Drawing Figures

PATENTED DEC 11 1973  3,778,647

ELECTRIC SALIENT-POLE MACHINE

BACKGROUND OF THE INVENTION

The invention relates to an improved cooling arrangement for cooling the windings of an electric salient-pole machine.

For increasing the capacity of electric machines, and in particular for generators driven by water power, it is known to assemble the windings with hollow conductors through which a cooling liquid flows directly. The cooling liquid is usually water. Direct cooling of this kind by a liquid is utilized for the stator winding as well as for the excitation winding on the salient poles of the electric machine.

Deutsche Auslegeschrift 1,538,720 discloses that direct cooling by a liquid of the starting winding of synchronous machine is performed with a cooling liquid flowing through the damping winding bars of the synchronous machine. This cooling arrangement for cooling the damping winding by a liquid is assembled as a self-contained cooling system.

SUMMARY OF THE INVENTION

It is an object of the invention to provide an improved cooling arrangement for an electric salient-pole machine.

It is another object of the invention to provide a cooling arrangement for directly cooling the damping and excitation windings of a salient-pole machine which utilized the heat capacity of the windings to help recool the cooling liquid.

An electric salient-pole machine has a damper winding and an excitation winding made up of damper conductors and excitation conductors respectively. The salient-pole machine is provided with a cooling arrangement for directly cooling the windings with a fluid. According to a feature of the invention, the cooling arrangement includes fluid supply means for supplying the cooling fluid. Damper passage means and excitation passage means are formed in the damper conductors and the excitation conductors respectively for conducting the fluid therethrough. The damper passage means is serially connected to the excitation passage means and the serial combination thereof is connected across the supply means so that the fluid flows first through the damper passage means. The fluid can be a liquid such as water for example, and the damper passage means is hydraulically connected to the excitation passage means.

Each of the conductors is an annular elongated member. The damper passage means is a plurality of the damper conductors hydraulically connected in series with the excitation passage means is a plurality of the excitation conductors hydraulically connected in series. The plurality of damper conductors are connected hydraulically in series with the plurality of excitation conductors and the serial combination of these conductors is connected across the supply means so that the cooling liquid flows first through damper conductors.

Connecting the conductors of the excitation winding and the conductors of the dampinng winding hydraulically in series in such a way that the cooling liquid always flows first through conductors of the damping winding affords considerable advantage for electric synchronous machines that are started asynchronously with the aid of the damping winding. The conductors of the damping winding are subjected to intense heat-loading during the asynchronous start of a synchronous machine, this being at a time when the excitation winding of the machine is still cold. By serially connecting the two windings hydraulically so that the cooling liquid flows first through the conductors of the damping winding, it is possible during the start-up of the machine to utilize the heat capacity of the excitation winding for recooling the cooling liquid that has become greatly heated in the conductors of the damping winding. During normal operation of the synchronous machine, the damping winding on the other hand conducts no current, or only a minimal current. The cooling liquid is therefore sufficiently cool as it enters the conductors of the now greatly heated excitation winding, so that through this series connection the removal of heat from the excitation winding is not impaired. Such a single cooling circuit for the cooling liquid configured according to the invention with a hydraulic serial connection of the damping winding and the excitation winding is efficacious under all operational conditions of the machine and is of low cost.

The electrical circuit arrangement of the conductors of the damping winding as well as of the excitation winding is completely independent of the hydraulic circuit of the cooling liquid flowing through the conductors and can therefore be arranged as desired.

According to a further feature of the invention, the fluid supply means can include a liquid supply hydraulically connected to the plurality of damper conductors for supplying the cooling liquid to the serial combination. The fluid supply means can further include a liquid receiver hydraulically connected to the plurality of excitation conductors for receiving the cooling liquid supplied to the serial combination. The liquid receiver is preferably in the form of a collecting conduit for receiving the cooling liquid from the excitation conductors and for directing the liquid away from the machine.

It is also possible to arrange the flow of the cooling liquid through the conductors of the excitation and damping winding in a way particularly suited to the operational conditions. Thus, it is possible to divide up the conductors of both windings disposed on one salient-pole into two or more flow circuits for the cooling liquid, the flow circuits being connected hydraulically in parallel.

Thus, in an electric salient-pole machine having a plurality of salient poles wherein each of the poles has a respective pluralities of the damper conductors and the excitation conductors, the plurality of damper conductors on each pole can be grouped into at least two damper sets of damper conductors with the conductors of each of the damper sets connected hydraulically in series. Likewise, the plurality of excitation conductors on each pole can be grouped into at least two excitation sets of excitation conductors with the conductors of each of the excitation sets connected hydraulically in series. Each of the damper sets is serially connected hydraulically with a corresponding one of the excitation sets on the same pole to form thereby at least two individual hydraulic series circuits per pole. The two circuits are hydraulically connected in parallel between the liquid supply and the liquid receiver.

The quantity of cooling liquid needed during start-up of the machine for cooling the damping winding can be decreased advantageously if, according to another embodiment of the invention, the cold cooling liquid coming from the cooling-liquid supply manifold flows first through only a portion of the conductors of the damping winding, and then through the conductors of the excitation winding, and thereafter through the remaining portion of the conductors of the damping winding. Finally, after leaving the last portion of the damping winding, the cooling liquid may be conducted directly to the flow-off collector for the cooling liquid. Stated otherwise, the plurality of damper conductors making up the damper winding can be grouped into two damper sets of damper conductors with the conductors of each of the damper sets connected hydraulically in series. The plurality of excitation conductors are connected hydraulically in series with and between the two damper sets. The serial combination of damper sets and excitation conductors is connected across the supply means, whereby the cooling liquid flows first through one of the damper sets, then through the plurality of excitation conductors, and finally through the other damper set.

The last discussed embodiment can be modified according to still another embodiment of the invention wherein the plurality of excitation conductors are also grouped into two excitation sets of excitation conductors. The conductors of each of the excitation sets are connected hydraulically in series and the damper sets and the excitation sets are connected in series alternately one after the other to form a composite hydraulic series circuit. This series circuit is connected across the supply means so that the cooling liquid flows first through one of the damper sets, then through one of the excitation sets, then through the other of the damper sets, and finally, through the other one of the excitation sets.

Thermal heat equalization can be obtained in the cooling arrangement of the invention by arranging the individual conductors in the excitation winding in such a way that adjacent conductors have cooling liquid flowing therethrough of different heats, the individual conductors being hydraulically connected in series. Preferably, and according to a feature of the invention, the excitation conductors of the excitation winding are disposed one adjacent the other so as to have the greatest possible difference in temperature between the cooling liquid flowing through mutually adjacent conductors.

Although the invention is illustrated and described herein as an electric salient-pole machine, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENTS

Figure 1:
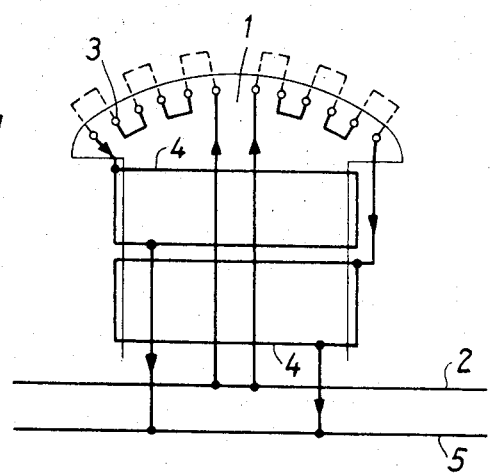
FIG. 1 is a hydraulic schematic diagram of the cooling arrangement according to the invention wherein the cooling liquid first flows through the conductors of the damping winding before flowing through the conductors of the excitation winding.

FIG. 1 illustrates a salient pole 1 of an electric generator driven by water power and on each pole there are arranged two cooling liquid circuits disposed in parallel. The cold cooling liquid coming from the cooling-liquid supply manifold 2 is in each instance first conducted through half of the conductors of the damping winding 3. The cooling liquid then flows over to the excitation winding 4 consisting of a plurality of conductors; these conductors are grouped into two sets of like quantity. The conductors of each set are connected so as to make up a hydraulic circuit represented in FIG. 1 as a rectangle. After flowing in suitable manner through the respective sets of the conductors of the excitation winding 4, the cooling liquid is then conducted to the cooling-liquid flow-off manifold 5. Between the cooling-liquid flow-off manifold 5 and the cooling-liquid supply manifold 2 are disposed apparatus for recooling or preparing the cooling liquid; these apparatus which are not shown are normally present in an open or closed cooling liquid circuit of an electric machine.

On each salient pole of the electric synchronous machine are disposed conductors of the damping winding 3 which are connected hydraulically in series with the conductors of the excitation winding 4. In this connection, it is advantageous for the cold cooling liquid coming from the cooling-liquid supply manifold 2 to first flow through the conductors of the damping winding 3. At the start-up of the electric synchronous machine, very high electric currents flow in the damping winding 3 thereby putting a great heat-load on the conductor. The excitation winding 4 is however cold during the asynchronous start-up. Thus during start-up, the greatly heated cooling liquid is conducted first through the cold conductors of the excitation winding 4 before it passes into the cooling liquid flow-off manifold 5. In this way, the cooling liquid cools somewhat in correspondence to the heat-capacity of the excitation winding 4, whereby the recooler provided in the cooling circuit is relieved of load.

If on the other hand, the excitation winding 4 becomes heated during normal operation of the synchronous machine, then little or no current flows through the conductors of the damping winding 3 so that these conductors cool down very rapidly; this cooling is further favored because these conductors are situated near the surface of the pole shoe of the salient pole 1. The cooling of the excitation winding 4 during normal operation of the synchronous machine is thus not impaired.

Figure 2:
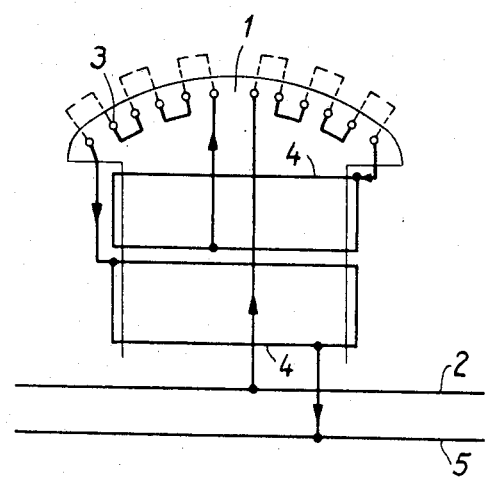
FIG. 2 is a hydraulic schematic diagram of an alternate embodiment of the cooling arrangement of the invention wherein the cooling liquid flows first through a portion of the conductors of the damper winding, then through a portion of the conductors of the excitation winding and thereafter through the remaining damper winding conductors, and finally, through the remaining conductors of the excitation winding.

FIG. 2 shows a somewhat modififed flow configuration of the hydraulic cooling circuit for the conductors of a salient pole 1 of an electric synchronous machine as, for example, a generator driven by water power. In this case, too, the conductors of the damping winding 3 are hydraulically in series with the conductors of the excitation winding 4. In this embodiment, the cold cooling liquid coming from the cooling-liquid supply manifold 2 is first conducted through half of the conductors of the damping winding 3. Then this cooling liquid flows through one half of the conductors of the excitation winding 4, and is again cooled down if heated greatly during its flow through the conductors of the damping winding 3. The cooling liquid then flows through the second half of the conductors of the damping winding 3 and thereafter through the second half of the conductors of the excitation winding 4, before the liquid passes into the cooling-liquid flow-off manifold 5. All the conductors disposed on the salient pole 1, that is, both of the conductors of the damping winding 3, and also the conductors of the excitation winding 4, are grouped into sets and the cooling liquid passes through these sets of conductors one after the other without having any parallel cooling circuits present.

Figure 4:
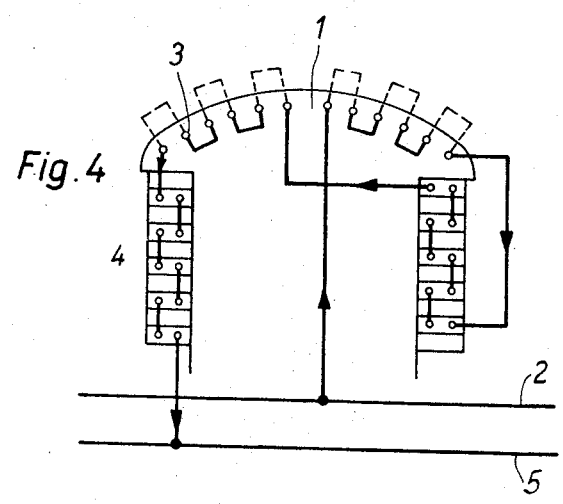
FIG. 4 illustrates how the conductors of the excitation winding are disposed one next to the other to obtain thermal heat equalization.

In FIG. 2 the two sets of serially connected excitation conductors are again represented schematically by rectangles. In actuality however, because the cooling liquid flowing out of the respective sets of the conductors of the damping winding is heated to different temperatures, the conductors of both sets of excitation conductors making up the excitation winding are distributed in interlaced fashion as illustrated in FIG. 4. The conductors are arranged such that cooling liquid flowing through mutually adjacent excitation conductors has as great a temperature difference as possible; this in addition, achieves a thermal equalization of heat.

Figure 3:
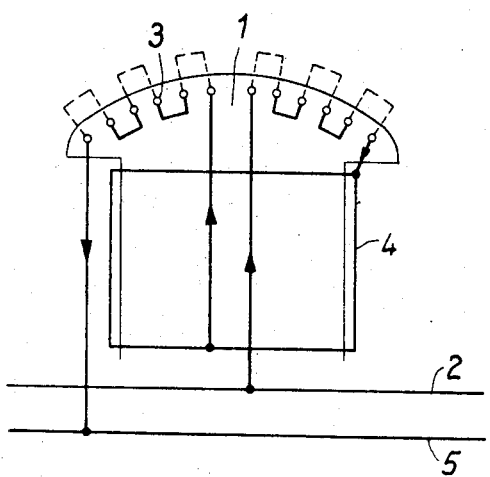
FIG. 3 is a hydraulic schematic diagram of still another embodiment wherein the cooling liquid flows directly to the flow-off conduit after flowing from the last portion of damper winding conductors.

FIG. 3 shows a further simplification of the hydraulic cooling circuit of FIG. 2 wherein the cold cooling liquid coming out of the supply manifold 2 flows first through half the conductors of the damping winding 3, and then through all conductors of the excitation windng 4 in which the liquid is recooled. Thereafter, the cooling liquid enters the second half of the conductors of the damping winding 3, and is then conducted into the cooling-liquid flow-off manifold 5. In this case therefore the total heat capacity of the excitation winding 4 is used to recool the cooling liquid after it has first flowed through the first half of the conductors of the damping winding 3. The cooling liquid then flowing from the second half of the damping winding 3 and reheated therein is conducted directly into the cooling-liquid flow-off manifold 5. This simplifies the hydraulic circuit of the cooling liquid.

What is claimed is:

1. In an electric salient-pole machine having a damper winding and an excitation winding made up of damper conductors and excitation conductors respectively, and an arrangement for directly cooling the windings with a fluid, the arrangement comprising fluid supply means for supplying the cooling fluid, damper passage means and excitation passage means formed in said damper conductors and said excitation conductors respectively for conducting the fluid therethrough, said damper passage means being serially connected to said excitation passage means, and the serial combination of said damper passage means and said excitation passage means being connected across said supply means so that the fluid flows first through said damper passage means.

2. The cooling arrangement of claim 1 wherein the cooling fluid is a liquid and wherein said damper passage means is hydraulically connected to said excitation passage means in series.

3. The cooling arrangement of claim 2 wherein each of the conductors is an annular elongated member, said damper passage means comprising a plurality of said damper conductors hydraulically connected in series, and said excitation passage means comprising a plurality of said excitation conductors hydraulically connected in series, said plurality of damper conductors being connected hydraulically in series with said plurality of excitation conductors, the serial combination of said plurality of damper conductors and said plurality of excitation conductors being connected across said supply means so that the cooling liquid flows first through said plurality of damper conductors.

4. The cooling arrangement of claim 3, said fluid supply means comprising a liquid supply hydruaulically connected to said plurality of damper conductors for supplying the cooling liquid to said serial combination, and a liquid receiver hydraulically connected to said plurality of excitation conductors for receiving the cooling liquid supplied to said serial combination.

5. The cooling arrangement of claim 4, said liquid receiver being a collecting conduit for receiving the cooling liquid from said plurality of excitation conductors and for directing the liquid away from the machine.

6. In an electric salient-pole machine having a plurality of salient poles, the cooling arrangement of claim 4, wherein each of the poles has respective pluralities of said damper conductors and said excitation conductors, the plurality of damper conductors on each pole being grouped into at least two damper sets of damper conductors, the conductors of each of said damper sets being connected hydraulically in series, and the plurality of excitation conductors on each pole likewise being grouped into at least two excitation sets of excitation conductors, the conductors of each said excitation sets being connected hydraulically in series, each of said damper sets being serially connected hydraulically with a corresponding one of said excitation sets on the same pole to form thereby at least two individual hydraulic series circuits per pole, said two circuits being hydraulically connected in parallel between said liquid supply and said liquid receiver.

7. The cooling arrangement of claim 6, the excitation conductors of both of said excitation sets being disposed one adjacent the other so that cooling liquid at respectively different temperatures flows through mutually adjacent conductors.

8. The cooling arrangement of claim 3, said plurality of damper conductors being grouped into two damper sets of damper conductors, the conductors of each of said damper sets being connected hydraulically in series, said plurality of excitation conductors being connected hydraulically in series with and between said two damper sets, the serial combination of said damper sets and said plurality of excitation conductors being connected across said supply means, whereby the cooling liquid flows first through one of said damper sets, then through said plurality of excitation conductors, and finally through the other set of said damper sets.

9. The cooling arrangement of claim 8, said plurality of excitation conductors being grouped into two excitation sets of excitation conductors, the conductors of each of said excitation sets being connected hydraulically in series, said damper sets and said excitation sets being connected in series alternately one after the other to form a composite hydraulic series circuit, said series circuit being connected across said supply means so that the cooling liquid flows first through one of said damper sets, then through one of said excitation sets, then through the other of said damper sets, and finally, through the other one of said excitation sets.

10. The cooling arrangement of claim 9, the excitation conductors of both of said excitation sets being disposed one adjacent the other so that cooling liquid at respectively different temperatures flows through mutually adjacent conductors.

* * * * *